United States Patent [19]

Zeilinger et al.

[11] 4,377,992
[45] Mar. 29, 1983

[54] INTERNAL COMBUSTION ENGINE WITH MASS BALANCE

[75] Inventors: Karl Zeilinger, Berglen; Reiner Bachschmid, Kernen, both of Fed. Rep. of Germany

[73] Assignee: Daimler-Benz Aktiengesellschaft, Stuttgart, Fed. Rep. of Germany

[21] Appl. No.: 180,474

[22] Filed: Aug. 22, 1980

[30] Foreign Application Priority Data

Sep. 1, 1979 [DE] Fed. Rep. of Germany ....... 2935384

[51] Int. Cl.³ ............................................. F02B 75/06
[52] U.S. Cl. .................................. 123/192 B; 74/604
[58] Field of Search ................. 123/192 R, 192 B; 74/603, 604

[56] References Cited

U.S. PATENT DOCUMENTS

| | | | |
|---|---|---|---|
| 1,163,832 | 12/1915 | Lanchester | 123/192 B |
| 3,511,110 | 5/1970 | Grieve | 123/192 B |
| 3,830,212 | 8/1974 | Seino et al. | 123/192 B |
| 4,300,493 | 11/1981 | Berti | 123/192 B |

FOREIGN PATENT DOCUMENTS

| | | | |
|---|---|---|---|
| 636227 | 2/1962 | Canada | 123/192 B |
| 1920569 | 11/1970 | Fed. Rep. of Germany | 123/192 B |

*Primary Examiner*—Craig R. Feinberg
*Assistant Examiner*—W. R. Wolfe
*Attorney, Agent, or Firm*—Craig & Burns

[57] ABSTRACT

An internal combustion engine provided with a mass balance unit of the second order. The mass balance unit includes two balancing shafts with each of the balancing shafts being provided with balancing weights. The balancing shafts are arranged on respective sides of the crankshaft of the engine and extend in parallel thereto. The balancing shafts are driven with a chain by a sprocket wheel seated on the crankshaft with one of the shafts being directly driven for rotation in the direction of rotation of the crankshaft and the other rotating, through the interposition of a pair of gear wheels, in a direction in opposition to the direction of rotation of the crankshaft. The directly driven balancing shaft with sprocket wheel is mounted on an inside of the lid covering an opening of the crankcase of the engine. The other balancing shaft is supported on a bearing cover for the crankshaft and the driving is effected from a sprocket wheel attached to a crank web of the crankshaft.

9 Claims, 6 Drawing Figures

INTERNAL COMBUSTION ENGINE WITH MASS BALANCE

The present invention relates to an internal combustion engine and, more particularly, to an internal combustion engine provided with a mass balance of the second order, with the mass balancing unit including two balancing shafts provided with balancing weights and arranged on both sides of the crankshaft in parallel thereto, which shafts are driven by a chain and sprocket wheel acting on the crankshaft, with one of the balancing shafts being directly driven and rotating in a direction of rotation of the crankshaft and the other balancing shaft rotating, with the interposition of a pair of gears wheels, in a direction opposite to the rotation of the crankshaft.

An internal combustion engine of the aforementioned type is proposed in, for example, Offenlungsschrift No. 2,531,239, wherein balancing shafts are disposed in parallel to a crankshaft on both sides of the cylinder block in special housings, with the balancing shafts extending from an end face of the cylinder block up to a center thereof. The balancing shafts are driven with a chain by means of a sprocket wheel seated on a front end of the crankshaft in such a manner that one balancing shaft, directly driven, rotates in a direction of rotation of the crankshaft and the other shaft rotates, throught the interposition of gear wheels, in opposition to the direction of rotation of the crankshaft.

Due to the arrangement of the balancing shafts in the aforementioned proposed construction, namely, laterally of the cylinder block and due to a driving of the balancing shafts from and end of the crankshaft, the structural width as well as the structural length of the internal combustion engine are disadvantageously enlarged. Additionally, the length of the balancing shafts and special housing required for the balancing shafts also disadvantageously require additional weight.

The aim underlying the present invention essentially resides in providing an arrangement and construction for the mass balance of the second order of an internal combustion engine wherein an outer dimension of the internal combustion engine are not enlarged compared to an engine having no balancing mass of the second order so that a compact structure is obtained.

In accordance with advantageous features of the present invention, the balancing shaft which is directly driven by a sprocket wheel is mounted on an inside of a lid covering an opening of the crankcase of the internal combustion engine, with the other balancing shaft being supported on a bearing cover for the crankshaft. The driving of the directly driven shaft is effected from a sprocket wheel attached to a crank web of the crankshaft.

By virtue of the above-noted features of the present invention, a very compact type of construction is obtained and the basic structure of the internal combustion engine does not require any substantial changes so that in manufacture and assembly the same machines and devices may be utilized for an internal combustion engine not provided with mass balance of the second order. Moreover, it is possible to produce an internal combustion engine selectively either with or without mass balancing.

In accordance with further advantageous features of the present invention, it is possible to provide, in the interest of reducing the overall weight for the balancing shaft supported in the bearing cover for the crankshaft, a drive shaft carrying a sprocket wheel and gear wheel, which shaft is supported, on the one hand, in the bearing cover receiving the balancing haft and, on the other hand, in an adjacent bearing cover for the crankshaft, with the drive shaft meshing with its gear wheel with a gear wheel arranged on the balancing shaft.

Advantageously, a chain tightener may be provided for the face of the chain disposed between the sprocket wheel on the crankshaft and the drive sprocket wheel for the balancing shaft, which balancing shaft is supported on the bearing cover for the crankshaft. The tightener may be attached to an inside of a lid covering an opening of the crank case. By virtue of the arrangement of the chain tightener on a lid, an easier mounting of the chain tightener is possible and, additionally, accessability for possible repairing purposes is satisfactorily ensured.

Additionally, in accordance with the present invention, a sliding rail may be provided for the chain face between the sprocket wheels associated with the two balancing shafts. In a zone of the sprocket wheel on the drive shaft for the balancing shafts supported in the bearing cover, the sliding rail may be fashioned as a chain box partially encompassing the sprocket wheel. Lubricating oil may be collected in the chain box so that a run of the chain along the sliding rail is always well lubricated. Furthermore, the chain is covered in such a manner that a backflowing oil in the oil pan is not impeded.

In accordance with yet another feature of the present invention, in order to ensure sufficient lubrication for the chain and gear wheels for the mass balancing unit, spray nozzles are provided and connected to the lubricating oil circulation system of the internal combustion engine. The spray nozzles are directed at each sprocket wheel onto the point of impact of the chain; a point of engagement of the pair of gears for the balancing shaft supported in the bearing cover, and also onto a point of impact at the chain tightener.

With an internal combustion engine having four cylinders and the crankshaft provided at least in front of the first and behind the last connecting rod bearing pin or journal with a counterweight, the sprocket wheel for driving the balancing shafts may be advantageously arranged either between the first and second cylinders or between the third and fourth cylinders and, for placing the sprocket chain on the crankshaft, either the counterweight in front of the first connecting rod bearing pin or journal or counterweight behind the last connecting rod bearing pin or journal may be detachably constructed.

Accordingly, it is an object of the present invention to provide an internal combustion engine with mass balancing of the second order which avoids, by simple means, shortcomings and disadvantages encountered in the prior art.

Another object of the present invention resides in providing an internal combustion engine with mass balancing which is extremely compact and of relatively light weight.

A further object of the present invention resides in providing an internal combustion engine with mass balancing of the second order which does not require any substantial changes in the manufacture and assembly of conventional internal combustion engines.

A still further object of the present invention resides in providing an internal combustion engine with mass balancing of the second order which does not require a structural widening or lengthening of the internal combustion engine.

Yet another object of the present invention resides in providing an internal combustion engine with mass balancing of the second order which functions realiably under all operating conditions.

These and other objects, features, and advantages of the present invention will become more apparent from the following description when taken in connection with the accompanying drawings which show, for the purposes of illustration only, one embodiment of an internal combustion engine provided with a mass balancing unit of the second order, and wherein.

Figure 1:
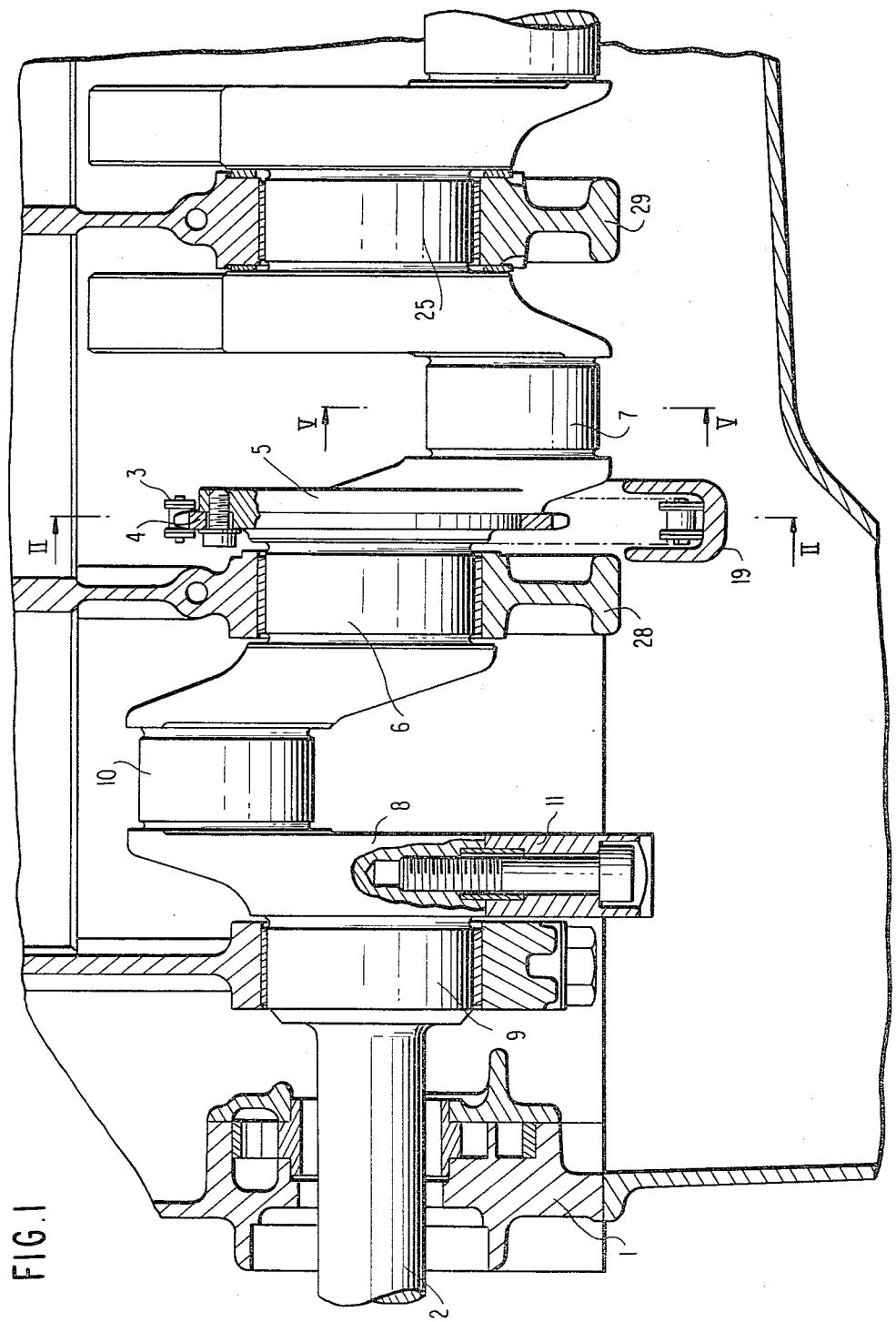
FIG. 1 is a longitudinal cross sectional view of a crankcase of an internal combustion engine constructed in accordance with the present invention.

Referring now to the drawings wherein like reference numerals are used throughout the various views to designate like parts and, more particularly, to FIG. 1, according to this Figure a four cylinder reciprocating piston internal combustion engine includes a crankshaft 2 supported in a crankcase 1. A chain 3 is provided for driving balancing shafts of the mass balance unit of the second order by the crankshaft 2. The chain 3 extends over a sprocket wheel 4 attached on a crank web 5 located between a second main bearing pin 6 and a connecting rod bearing journal 7 for the second cylinder. The attachment to the crank web 5 may be accomplished by means of a fastener arrangement such as, for example, screws or bolts. To enable an attachment of the sprocket wheel 4 to the crankshaft 2 prior to a mounting thereof, a balancing weight 11, provided on the crank web 8 between the first main bearing pin 9 and the connecting rod bearing pin or journal 10 for the first cylinder, is detachably fastened to the crankshaft 2 by means of suitable fasteners such as, for example, screws or bolts.

Figure 2:
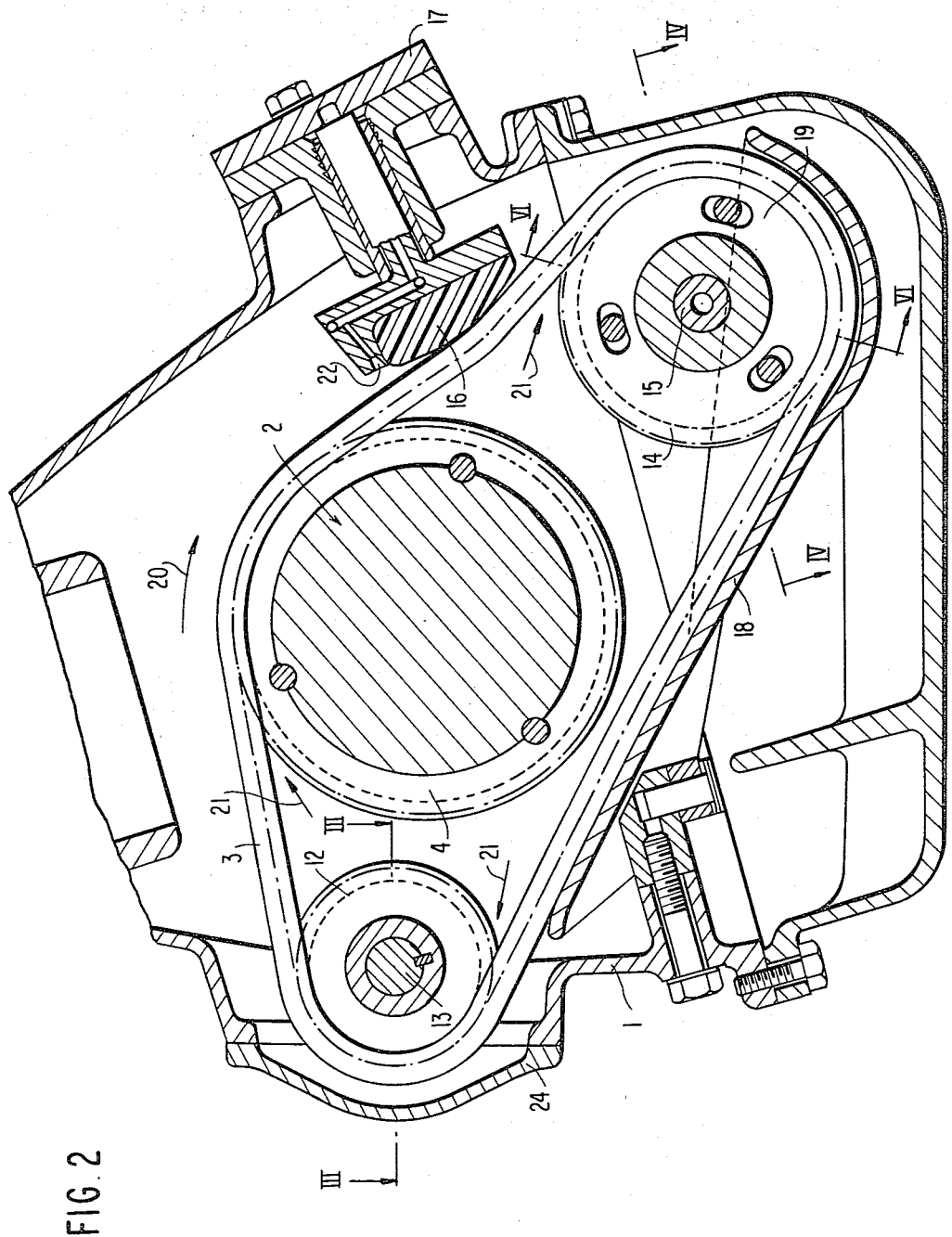
FIG. 2 is a cross sectional view through the crankcase of the engine of FIG. 1 taken along the line II—II.

As shown most clearly in FIG. 2, the chain 3 is, on the one hand, in engagement with a sprocket wheel 12 connected with one balancing shaft 13 for rotation therewith and, on the other hand, with a sprocket wheel 14 connected with a drive shaft 15 for the other balancing shaft for rotation therewith. A chain tightener 16 is provided for the chain face between the sprocket wheel 4 and the sprocket wheel 14. The chain tightener 16 is mounted to an inside of a lid 17 which covers an opening in the crankcase 1. Moreover, a sliding rail 18 is arranged for the chain face between the sprocket wheels 14 and 12, with the sliding rail 18 being fashioned, in a zone of the sprocket wheel 14 as a chain box 19 partially encompassing the sprocket wheel 14.

Spray nozzles (not shown) connected to a lubricating oil circulation system of the internal combustion engine, are provided for the chain 3. The chain 3 revolves or rotates in a direction of the arrow 20. The respective spray nozzles spray lubricating oil in a direction of the arrows 21 onto the run-up or impact points of the chain 3. The chain tightener 17 is also provided with a spray nozzle 22 which sprays lubricating oil onto the impact or run-up point of the chain 3 at the chain tightener.

Figure 3:
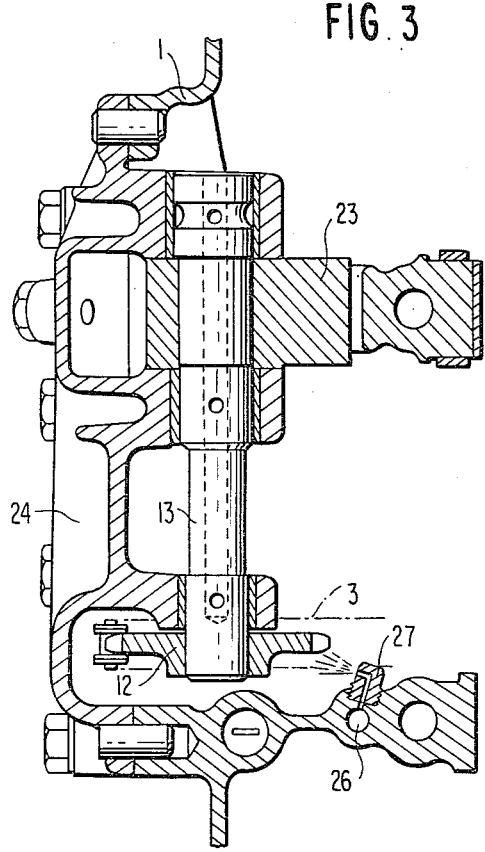
FIG. 3 is a cross sectional view taken along the line III—III of FIG. 2.

As shown in FIG. 3, the balancing shaft 13 is supported with the sprocket wheel 12 and balancing weights 23 on an inside of a lid 24 covering an opening in the crankcase 1. The lid 24 is threadedly attached to the crankcase. The balancing weights 23 lie in a plane of a main bearing pin 25 (FIG. 1), with a spray nozzle 27, connected to a lubricating oil bore 26 in the crankcase 1, spraying lubricating oil onto a point of impact of the chain 3 at the sprocket wheel 12.

Figure 4:
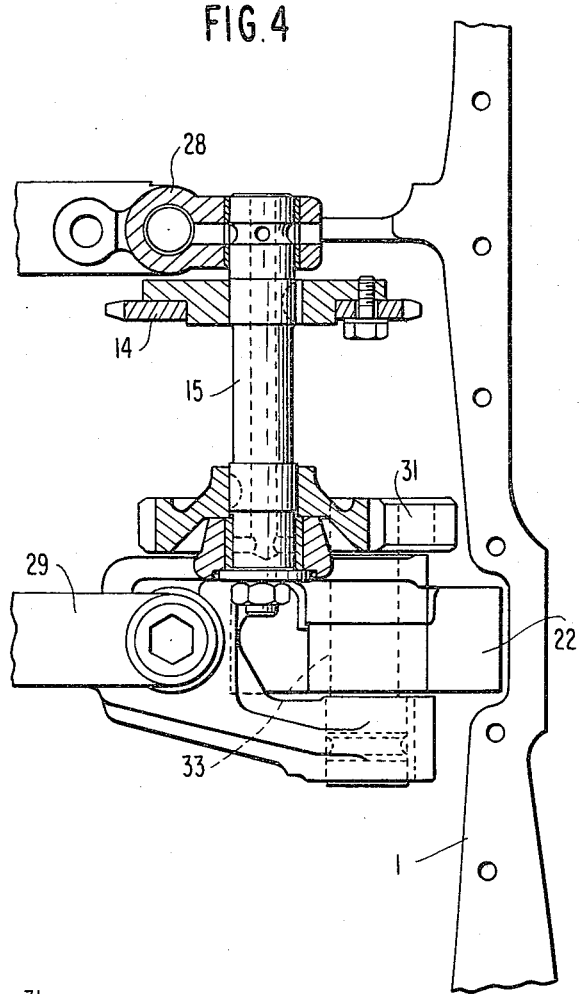
FIG. 4 is a cross sectional view taken along the line IV—IV of FIG. 2.
Figure 6:
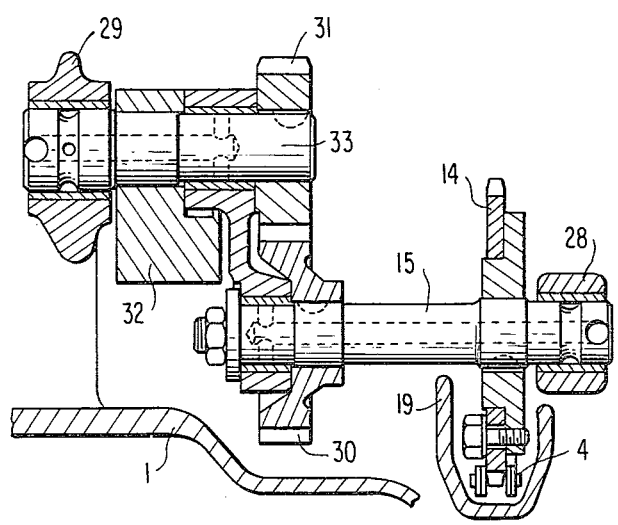
FIG. 6 is a cross sectional view taken along the line VI—VI in FIG. 2.
Figure 5:
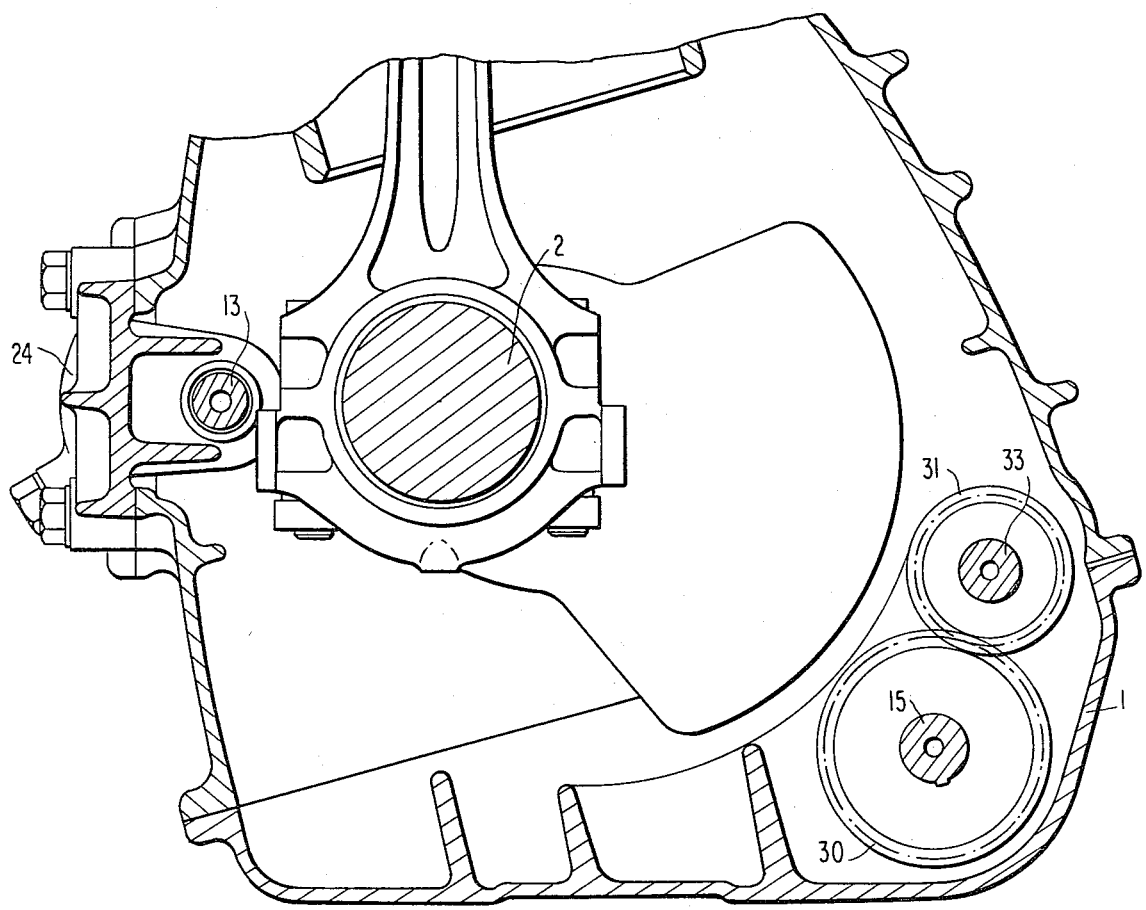
FIG. 5 is a cross sectional view taken along the line V—V of FIG. 1.

As shown in FIGS. 4, 5, and 6, the drive shaft 15 is supported in a bearing cover 28 for the main bearing pin 6 (FIG. 1) of the crankshaft 2 and in a bearing cover 29 for the main bearing pin 25 (FIG. 1) of the crankshaft 2. The sprocket wheel 14 for the chain 3 is arranged beside the bearing cover 28, while a gear 30 is arranged beside the bearing cover 29 on the drive shaft 15. The gear wheel 30 meshes with a gear wheel 31 seated on the balancing shaft 33 provided with a balancing weight 32 and supported at the bearing cover 29.

The balancing shaft 13 with the balancing weights 23, driven directly by the crankshaft 2 with the chain 3, rotates at twice the number of revolutions of the crankshaft 2 in a direction of rotation of the latter. The indirectly driven balancing shaft 33 with balancing weight 32 likewise rotates at twice the speed of the crankshaft 2; however, due to the interposition of the gear wheels 30, 31, the indirectly driven balancing shaft 33 is driven in a direction of rotation opposite to the direction of rotation of the crankshaft 2.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. An internal combustion engine provided with a mass balance means of the second order, the mass balance means includes two balancing shafts respectively arranged on each side of and parallel to a crankshaft of the engine, balancing weight means on each of the balancing shafts, means for directly driving one of the balancing shafts in a direction of rotation of the crankshaft and for indirectly driving the other of the balancing shafts in a direction of rotation opposite the direction of rotation of the crankshaft, characterized in that a lid means is provided for covering an opening of a crankcase of the engine, a bearing cover means is provided for covering a main bearing pin of the crankshaft, the directly driven balancing shaft is mounted on an inside of the lid means, the indirectly driven balancing shaft is supported on the bearing cover means, the driving means includes a sprocket wheel attached to a crank web of the crankshaft, a chain means cooperable with the sprocket wheel attached to the crank web of the crankshaft, a drive shaft means having a drive sprocket wheel on a first gear mounted thereon, a further gear cooperable with the first gear is provided on the indirectly driven balancing shaft, and in that the drive shaft means is supported in the bearing cover means and an adjacent bearing cover for the crankshaft.

2. An internal combustion engine according to claim 1, characterized in that the drive means further includes an additional sprocket wheel mounted on the directly driven balancing shaft, a sliding rail means is provided for guiding a movement of the chain means between the drive sprocket wheel and the additional sprocket wheel, and in that at least a portion of the sliding rail at least in an area of the drive sprocket wheel is formed as a chain box means for partially encompassing the drive sprocket wheel.

3. An internal combustion engine according to claim 1, characterized in that a chain tightener means is cooperable with a face of the chain at a position between the sprocket wheel attached to the crank web of the crankshaft and the drive sprocket wheel, and in that the chain tightener means is attached to an inside of a further lid means covering an opening in the crankcase.

4. An internal combustion engine according to one of claims 1 or 3, characterized in that the internal combustion engine includes a lubricating oil circulatory system, spray nozzle means are connected to the lubricating oil circulatory system and are directed to impact points for the chain means.

5. An internal combustion engine according to one of claims 1 or 3, wherein the internal combustion engine is a four cylinder engine, and wherein the crankshaft is provided with a counterweight at least in front of a first connecting rod bearing pin and a last connecting rod bearing pin, characterized in that the sprocket wheel attached to the crank web of the crankshaft is arranged between the first and second cylinders and in that at least the counterweight in front of the first connecting rod bearing pin is detachable from the crankshaft so as to enable the sprocket wheel to be attached to the crank web of the crankshaft.

6. An internal combustion engine according to claim 3, characterized in that the drive means further includes an additional sprocket wheel mounted on the directly driven balancing shaft, a sliding rail means is provided for guiding a movement of the chain means between the drive sprocket wheel and the additional sprocket wheel, and in that at least a portion of the sliding rail at least in an area of the drive sprocket wheel is formed as a chain box means for partially encompassing the drive sprocket wheel.

7. An internal combustion engine according to claim 6, characterized in that the engine further includes a lubricating oil circulatory system, a plurality of spray nozzle means are connected to the lubricating oil circulatory system and are respectively directed to impact points for the chain means, meshing points of the gear and further gear, and the chain tightener means.

8. An internal combustion engine according to claim 6, wherein the internal combustion engine is a four cylinder engine, and wherein the crankshaft is provided with a counterweight at least in front of a first connecting rod bearing pin and a last connecting rod bearing pin, characterized in that the sprocket wheel attached to the crank web of the crankshaft is arranged between the first and second cylinders, and in that at least the counterweight in front of the first connecting rod bearing pin is detachable from the crankshaft so as to enable the sprocket wheel to be attached to the crank web of the crankshaft.

9. An internal combustion engine according to one of claims 1, 3, or 6, wherein the internal combustion engine is a four cylinder engine, and wherein the crankshaft is provided with a counterweight at least in front of a first connecting rod bearing pin and a last connecting rod bearing pin, characterized in that the sprocket wheel attached to the crank web of the crankshaft is arranged between the third and fourth cylinders, and in that at least the counterweight behind the last connecting rod bearing pin is detachable from the crankshaft so as to enable the sprocket wheel to be attached to the crank web of the crankshaft.

* * * * *